United States Patent [19]

Dezelan

[11] 4,099,588
[45] Jul. 11, 1978

[54] RESPONSIVE PILOT-OPERATED CONTROL VALVE FOR FRONT WHEEL DRIVE

[75] Inventor: Joseph Edward Dezelan, Western Springs, Ill.

[73] Assignee: Caterpillar Tractor Co., Peoria, Ill.

[21] Appl. No.: 719,623

[22] Filed: Sep. 1, 1976

[51] Int. Cl.² .................... F16K 11/06; B60K 17/02
[52] U.S. Cl. .................... 180/44 F; 137/625.66; 91/433
[58] Field of Search ............... 180/44 F, 44 M, 66 R; 137/625.6, 625.66, 596.2; 91/433

[56] References Cited

U.S. PATENT DOCUMENTS

| | | | |
|---|---|---|---|
| 3,458,005 | 7/1969 | Malm | 180/44 M |
| 3,480,099 | 11/1969 | Nighswonger | 52/443 |
| 3,481,419 | 12/1969 | Kress | 180/44 M |
| 3,506,081 | 4/1970 | Rumsey | 180/44 F |
| 3,557,829 | 1/1971 | Finley | 137/596.2 |
| 3,763,746 | 10/1973 | Walters | 91/433 |
| 3,818,802 | 6/1974 | Wilson | 137/625.66 X |
| 3,897,719 | 8/1975 | Tipton | 137/625.66 X |

Primary Examiner—Joseph F. Peters, Jr.
Assistant Examiner—Terrance L. Siemens
Attorney, Agent, or Firm—Wegner, Stellman, McCord, Wiles & Wood

[57] ABSTRACT

A pilot-operated, spring-centered, directional control valve includes a valve body having a bore, chambers at opposite ends of the bore, a valve spool slidably disposed within the bore, a hollow piston slidably disposed within each of the chambers and biased by springs inwardly toward the spool, and a secondary piston slidably disposed within one of the primary pistons so that pilot pressure directed into the outward ends of the chambers acts on the end of the spool or the end of the secondary piston to selectively operate the valve. The various components of the valve have differing effective cross-sectional areas upon which pilot pressure acts. The control valve is advantageously employed in a hydraulic system controlling front wheel drive in a vehicle.

12 Claims, 2 Drawing Figures

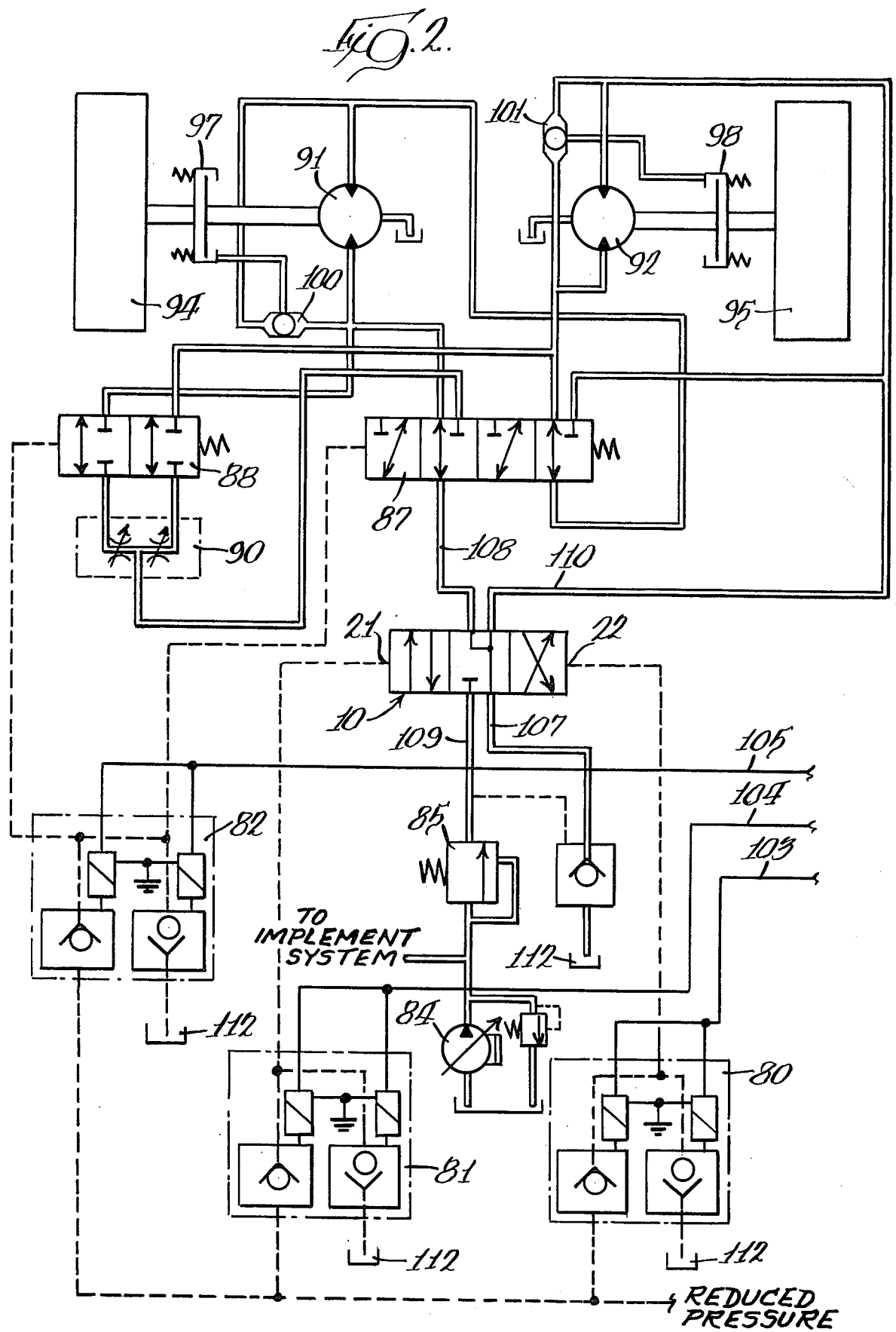

RESPONSIVE PILOT-OPERATED CONTROL VALVE FOR FRONT WHEEL DRIVE

BACKGROUND OF THE INVENTION

This invention relates generally to a valve and, more particularly, to a pilot-operated, spring-centered, control valve. The invention is also directed to the employment of such a control valve in a circuit-controlling operation of a hydrostatic front wheel drive system for a vehicle.

The invention is concerned with a sliding spool-type directional control valve in which a valve spool slides axially in a bore formed in a valve body to control the direction of hydraulic fluid flow therethrough. Such spool valves are often remotely controlled by the use of pilot pressure which is applied at the ends of the spool. Spool valves may also be spring-centered so that springs located at either end of the spool bias the spool to a centered position within the bore. The spool is held in its normal centered position by the springs and shifted to other offset positions by the application or removal of pilot pressure at the ends of the spool. Walters U.S. Pat. No. 3,763,746 and Finley U.S. Pat. No. 3,557,829 disclose directional control valves which are spring-centered and pilot-controlled.

During operation of a spool valve, the spool may be shifted from one offset position on one side of its centered position immediately to an offset position on the other side. The springs will cause the spool to move to a centered position, but a pressure differential is required to move the spool beyond the centered position to a new offset position. In spool valves of conventional design, pilot pressure does not move the valve spool rapidly enough to prevent a noticeable time lag between the application or removal of pilot pressure and movement of the spool.

Some pilot-operated directional control valves employ a differential pilot piston to actuate the valve spool. Since the speed of a pilot-operated spool or piston is a function of its effective cross-sectional area and the pressure applied to that effective area, the use of a piston to drive a spool of differing size will proportionally modify spool speed for any given amount of applied pilot pressure.

While it is intended that the control valve be employed in an environment such as that shown in Kress et al. U.S. Pat. No. 3,481,419, Nighswonger et al. U.S. Pat. No. 3,480,099 and Malm et al. U.S. Pat. No. 3,458,005, which are illustrative of hydrostatic front wheel drive systems for vehicles having hydraulic drive motors, pressure-actuated clutches, and means for series or parallel mode drive, the control valve shown herein may be employed in other hydraulic circuits in which immediate response to pilot pressure is required.

SUMMARY OF THE INVENTION

The principal object of this invention is to provide a pilot-operated directional control valve in which the travel time between centered or offset positions is lessened. More specifically, it is an object of the invention to provide a directional control valve which can be advantageously used in a front wheel drive hydraulic control system which responds effectively and rapidly to the control of the operator.

In accordance with the present invention, a pilot-operated directional control valve includes a valve body having a bore and chambers at opposite ends of the bore communicating therewith, a valve spool slidably disposed within the bore, a primary piston slidably disposed within each of the chambers and having a bore extending therethrough, a secondary piston slidably disposed within the bore of one of the primary pistons, and pilot ports to communicate each of the chambers with a source of pilot pressure. When pilot pressure is applied through a pilot port, it acts on either the end of the valve spool or the ends of the pistons so as to urge the spool inwardly away from the pressurized pilot port. In a valve constructed according to the invention, the spool rapidly recenters itself when equal pressure exists in both chambers.

In an exemplary embodiment of the invention, the effective cross-sectional area of the secondary piston is less than the effective cross-sectional area of the end of the valve spool which, in turn, is less than the combined effective cross-sectional area of the secondary piston and the primary piston having the secondary piston. The inclusion of a shoulder at the inward ends of each of the chambers limits the amount of inward movement of the primary pistons. As a result, when equal amounts of pilot pressure are applied through each of the pilot ports, the valve spool will move to or remain at a centered position. When pilot pressure is vented at one of the pilot ports, pilot pressure no longer acts on one end of the valve spool, so that the pilot pressure already acting through the other pilot port generates a force differential which causes the valve spool to move rapidly in response to the difference in pilot pressure.

Springs are employed to continuously bias each of the primary pistons inwardly toward the bore of the valve body to normally engage the valve spool. The springs are capable of moving the valve spool to a centered position when no pilot pressure is applied at either of the pilot ports. Because of the shoulders, the springs do not drive the spool beyond its centered position.

The inclusion of the directional control valve in a hydrostatic front wheel drive control system overcomes any undesirable lack of immediate response to the front wheels to operator control. As a result, the time delay between actuation of the directional control valve and the operation of the front wheel drive is reduced. When going from one gear to another gear, there is immediate response to operator control so that motive power is rapidly and effectively transferred to the front wheels of the vehicle.

BRIEF DESCRIPTION OF THE DRAWINGS

FIG. 2 is a schematic illustration of a hydraulic control system for a vehicle front wheel drive in which the control valve of FIG. 1 is advantageously employed.

DESCRIPTION OF THE PREFERRED EMBODIMENT

Figure 1:
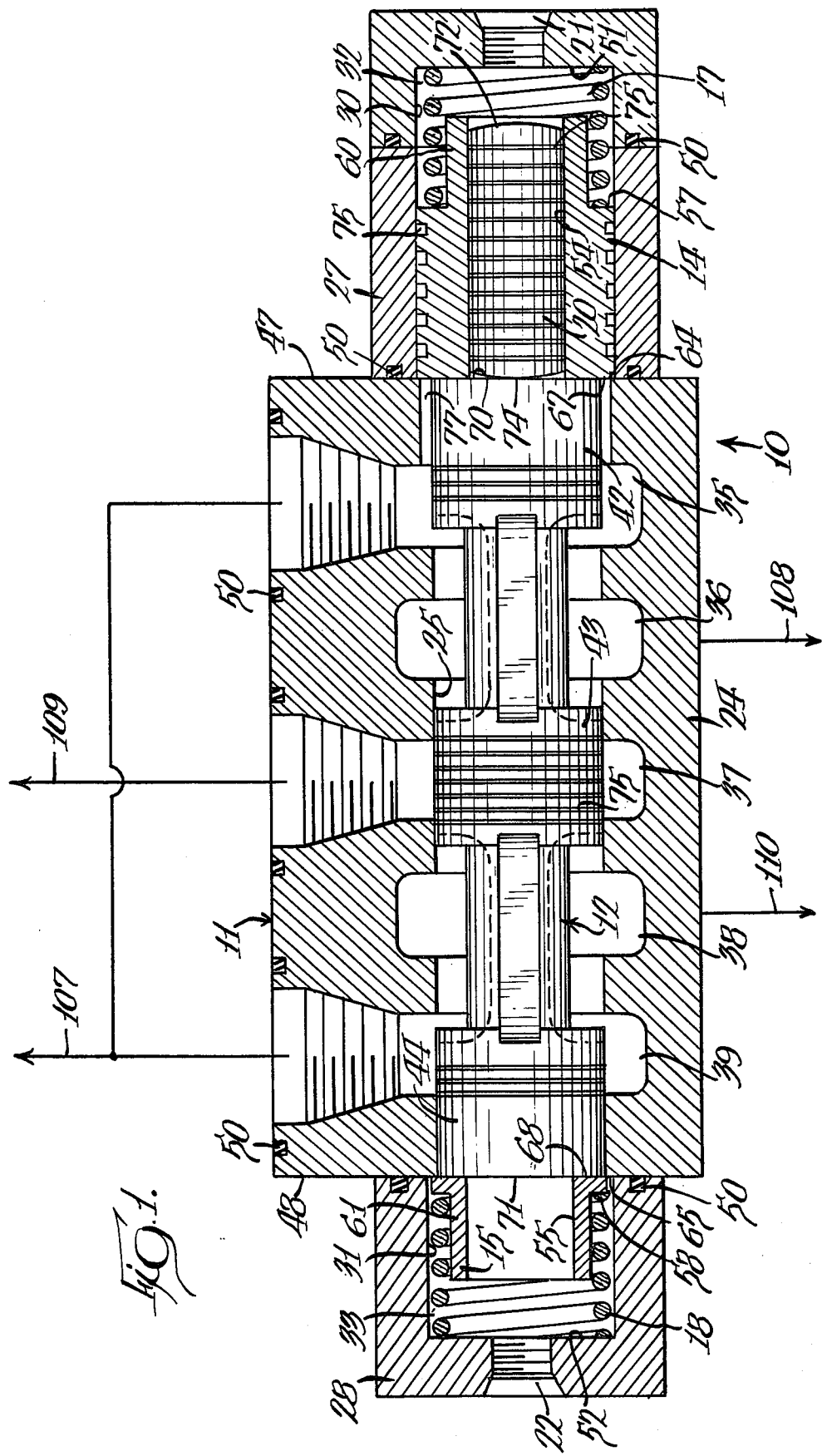
FIG. 1 is a central section of the control valve of the invention showing the operative components in one position thereof.

A pilot-operated control valve, generally designated 10, constructed according to the invention primarily includes a hollow valve body, generally designated 11; a main directional valve spool, generally designated 12, slidable within the valve body 11; a pair of hollow primary pistons 14 and 15, one at each end of the valve spool 12; springs 17 and 18 biasing the respective primary pistons 14 and 15 inwardly toward the valve spool 12; a secondary piston 20 slidable within the primary piston 14; and a pair of pilot ports 21 and 22 providing communication with a source of pilot pressure for selective operation of the control valve 10.

The valve body 11 has a central section 24 having a longitudinally extending cylindrical bore 25 and two end sections 27 and 28 having respective cylindrical bores 30 and 31 defining piston chambers 32 and 33. The central section 24 has a series of passages 35, 36, 37, 38 and 39 opening into the bore 25. The passages 35-39 are connected to external conduits through which hydraulic fluid may be directed into the bore 25. The valve spool 12 has an axial length substantially corresponding to the length of the bore 25 and has cylindrical lands 42, 43 and 44 which slidably seal within the bore 25 and selectively control communication beween the passages 35-39.

The end sections 27 and 28 are secured at opposite ends 47 and 48, respectively, of the central section 24 and are axially aligned with the bore 25. Appropriate seals 50 are provided between the various components to prevent fluid leakage. Each of the cylindrical chambers 32 and 33 has an outward wall 51 and 52, respectively, in which the respective pilot bores 21 and 22 are disposed to provide communication between a source of pilot pressure and the outward ends of the respective chambers 32 and 33.

The primary pistons 14 and 15 are slidably disposed within their respective chambers 32 and 33 for axial movement inwardly toward and outwardly away from the central section 24. The primary pistons 14 and 15 each have a bore 54 and 55, respectively, to provide communication between the inward and outward portions of the respective chambers 32 and 33, have respective annular shoulders 57 and 58 at inward ends, and have respective narrow portions 60 and 61 at outward ends. The springs 17 and 18 are thus coiled around the outer portions 60 and 61 and act between the outward walls 51 and 52 of the end sections 27 and 28 and the shoulders 57 and 58 of the primary pistons 14 and 15 to incontinuously bias the primary pistons 14 and 15 inwardly toward the central section 24. Each of the bores 30 and 31 is diametrically greater than the bore 25 of the central section 24. Annular shoulders 64 and 65 are thus defined by the ends 47 and 48 of the central section 24 at the inward end of each of the chambers 32 and 33 about each of the ends of the bore 25. Springs 17 and 18 thus urge the primary pistons 14 and 15 inwardly toward a center position until the inward ends 67 and 68 of the primary pistons 14 and 15 abut the respective shoulders 64 and 65.

The secondary piston 20 is disposed within the bore 54 so that it may slide therein and engage the end 70 of the land 42 of the valve spool 12. The secondary piston 20 has an outward end 72 exposed to the outward portion of the chamber 32 and an inward end 74 adapted to contact the end 70 of the valve spool 12.

As can be seen in FIG. 1, the diameter of the end 71 of the land 44 is greater than the diameter of the secondary piston 20. As a result, the cross-sectional area of stem end 71 of land 44 is greater than the cross-sectional area of end 72 of the secondary piston 20. The cross-sectional area of the bores 30 and 31 is greater than the cross-sectional area of the lands 42, 43 and 44. Bores 30 and 31 can be the same size. The only requirement is that bores 30 and 31 must be larger than the diameter of lands 42, 43 and 44 so as to provide a shoulder 64 and 65. As the effective cross-sectional areas are dissimilar, the hydraulic force applied to these surfaces will also be dissimilar given equal pressure.

The primary piston 14, the secondary piston 20, and the lands 42–44 of the valve spool 12 have circumferential balancing grooves 75 to prevent binding. In addition, a bleed slot 77 is provided in the bore 25 at the end of the central section 24 adjacent the primary piston 14.

Referring to FIG. 2, the hydraulic control circuit for the front wheel drive system includes the pilot-operated forward and reverse control valve 10, solenoid-operated pilot control valves 80, 81 and 82, a variable displacement pressure-compensated pump 84, a priority valve 85, a pilot-operated series-parallel control valve 87, a pilot-operated control valve 88 connected to a flow divider/combined valve 90, a pair of fixed displacement hydraulic drive motors 91 and 92 coupled to front wheels 94 and 95 through clutches 97 and 98, and a pair of shuttle valves 100 and 101.

Hydraulic fluid normally utilized to manipulate the implements of the vehicle may be at least partially diverted to operate the front wheel drive by the action of the priority valve 85. Operation of the solenoid control valves 80-82 is controlled by electric signals directed through respective lines 103, 104 and 105 connected to the vehicle transmission control (not shown) which actuates the rear wheel drive train. These electric signals permit the operator to drive the front wheels 94 and 95 in forward and reverse. When the wheels 94 and 95 are initially actuated, with the vehicle in first gear and second gear, hydraulic fluid flows to both motors 91 and 92 in parallel to establish flow speed, high torque operation. When the vehicle is shifted to third gear and forth gear forward speed, the motors 91 and 92 are hydraulically connected in series to establish high speed operation.

As seen in FIG. 1, the passages 35 and 39 are both connected to a conduit 107; the passage 36 to a conduit 108, the passage 37 to a conduit 109; and the passage 38 to a conduit 110.

A main switch (not shown) may be operated at an off position so that solenoid valves 80 and 81 are deactivated to vent both chambers 32 and 33 to the reservoir 112, the valve spool 12 thereby being centered to the valve body 11 to block fluid flow from the pump 84 to the motors 91 and 92. The springs 17 and 18 urge respective primary pistons 14 and 15 against the shoulders 64 and 65, respectively.

When the main switch is operated at an on position and the vehicle transmission control is in neutral, the solenoid valves 80 and 81 are activated so that pilot fluid is directed into ports 21 and 22 on the control valve 10. The valve spool 12 remains centered since the force acting on the end 72 of pilot piston 20 cannot overcome the force acting on the end 71 of the valve spool 12 which, in turn, cannot overcome the combined force acting on the end 72 of the pilot piston 20 and the end of the primary piston 14 which is stopped by the annular shoulder 64.

When the first speed is implemented, the solenoid valve 80 is deactivated so that pilot fluid in the chamber 33 is vented to the reservoir 112. The solenoid 81 remains activated so that pilot pressure is still being directed through the port 21 of the control valve 10 to rapidly shift it to its forward position. Similarly, the solenoid valve 82 is activated so that the control valve 88 is shifted to allow fluid flow therethrough and the control valve 87 is shifted to a parallel flow position. As a result, fluid under pressure being delivered from the pump 84 is directed through the valve 10 and the control valve 87 and is divided by the valve 90 so that the fluid under pressure is split to flow in a substantially equal manner to each of the drive motors 91 and 92. The shuttle valves 100 and 101 operate to provide the greater of motor inlet or motor outlet pressures for operation of the clutches 97 and 98 while blocking the lesser.

When the front wheel drive system is eventually shifted to its third gear forward position, the solenoid 82 is deactivated so that control valve 88 prevents fluid flow therethrough and the control valve 87 returns to its series mode. As a result, fluid under pressure being delivered by the pump 84 flows through the control valve 10 and the control valve 87 drives the motor 91 and returns through the control valve 87 to drive the other motor 92. It is thereafter directed back through the control valve 10 to the reservoir 112.

When the vehicle transmission control is shifted so that the vehicle is driven in a reverse direction, the solenoid valve 81 is deactivated and the solenoid valve 80 will be activated. Pilot pressure from the solenoid valve 80 moves the control valve 10 to its reverse position so that hydraulic fluid is directed from the pump 84 to the drive motors 91 and 92 in a reverse mode so that the vehicle is driven backwardly. If the vehicle was in neutral, pilot pressure is maintained and already acting on the end 71 of the valve spool 12 so that venting the chamber 32 to the reservoir 112 would rapidly cause a force differential which would drive the valve spool 12 toward the port 21.

The control valve 10 is designed so that it may be shifted from one position to another in a more responsive manner. As a result, the time delay when this changeover occurs is lessened.

When the vehicle clutch is depressed or the vehicle shifted to neutral, the solenoid valves 80 and 81 are activated to direct pilot fluid into the ports 21 and 22, causing a rapid shift of the valve spool 12 to its centered position by establishing equal pressure on unequal areas, as previously described.

When the control valve 10 is not under influence of pilot pressure because both of the solenoid valves 80 and 81 are deactivated, the springs 17 and 18 acting on the respective primary pistons 14 and 15 cause the spool 12 to return to a normally centered position since there is no external hydraulic force acting through the pistons on the ends 70 and 71 of the spool 12.

Whenever hydraulic pilot pressure is applied through the port 21 only, a force is applied to the outward end 72 of the secondary piston 20 to move it inwardly through the primary piston 14, thus moving the spool 12 toward the port 22 so that the conduit 109 is connected to the conduit 108 leading to the control valve 87.

However, when pilot pressure is directed from the solenoid valve 81 to the port 22 only, hydraulic force is generated on the end 71 of the spool 12 to move the spool 12 toward the port 21 so as to communicate the pump 84 with the drive motor 92 and the control valve 87 with the reservoir 112. Because the effective cross-sectional area is greater at the end 71 of the spool 12 than on the outward end 72 of the secondary piston 20, and since pilot pressure is no longer directed on the outward end 72 of the secondary piston 20, there is a rapid response to the pilot pressure in port 22 to move the valve spool 12.

It can be appreciated that the directional control valve 10 shown herein has a valve spool 12 which is shifted by selectively venting pilot pressure in the chambers 32 and 33 thereby achieving more rapid response than achieved when shifting is accomplished by selective application of pilot pressure.

What is claimed is:

1. A directional control valve comprising:
   a valve body having a longitudinally extending bore and a chamber at opposite ends of said bore communicating therewith, each of said chambers having an inward portion and an outward portion;
   passage means in said valve body adapted to communicate said bore selectively with a source of fluid under pressure with a reservoir and with pressure-actuated devices;
   a valve spool having oppositely disposed ends and being reciprocable within said bore to control communication between said passage means;
   a primary piston reciprocable within each of said chambers and having a bore extending longitudinally between an inward end and an outward end to provide communication between the inward and outward portions of its respective chamber;
   spring means continuously biasing each of said primary pistons inwardly toward said bore of said valve body to normally engage said spool and center said spool within said bore of said valve body;
   a single secondary piston reciprocable within said bore of only one of said primary pistons and sealing against the bore thereof and having an outward end exposed to the outward portion of its respective chamber; and
   pilot ports to communicate the outer portions of each of said chambers with a source of pilot pressure whereby pilot pressure applied through a pilot port to the chamber having the secondary piston acts on the outward end of the secondary piston to urge said spool inwardly away from the pressurized pilot port and whereby pilot pressure applied through a pilot port to the chamber lacking the secondary piston acts on the end of said spool to urge said spool inwardly away from the pressurized pilot port.

2. A directional control valve comprising:
   a valve body having a longituinally extending bore and a chamber at opposite ends of said bore communicating therewith, each of said chambers having an inward portion and an outward portion;
   passage means in said valve body adapted to communicate said bore selectively with a source of fluid under pressure with a reservoir and with pressure-actuated devices;
   a valve spool having oppositely disposed ends and being reciprocable within said bore to control communication between said passage means;
   a primary piston reciprocable within each of said chambers and having a bore extending longitudinally between an inward end and an outward end to provide communication between the inward and outward portions of its respective chamber;
   spring means continuously biasing each of said primary pistons inwardly toward said bore of said valve body to normally engage said spool and center said spool within said bore of said valve body;
   a secondary piston reciprocable within said bore of one of said primary pistons and having an outward end exposed to the outward portion of its respective chamber, the effective cross-sectional area of the bore of a primary piston lacking a secondary piston is greater than the effective cross-sectional area of a secondary piston; and pilot ports to communicate the outer portions of each of said chambers with a source of pilot pressure whereby pilot pressure applied through a pilot port acts on at least one of the outward ends of the respective secondary piston and the respective end of said spool so as to urge said spool inwardly from the pressurized pilot port.

3. A directional control valve comprising:

a valve body having a longitudinally extending bore and a chamber at opposite ends of said bore communicating therewith, each of said chambers having an inward portion and an outward portion;

passage means in said valve body adapted to communicate said bore selectively with a source of fluid under pressure with a reservoir and with pressure-actuated devices;

a valve spool having oppositely disposed ends and being reciprocable within said bore to control communication between said passage means;

a primary piston reciprocable within each of said chambers and having a bore extending longitudinally between an inward end and an outward end to provide communication between the inward and outward portions of its respective chamber;

spring means continuously biasing each of said primary pistons inwardly toward said bore of said valve body to normally engage said spool and center said spool within said bore of said valve body;

a secondary piston reciprocable within said bore of one of said primary pistons and having an outward end exposed to the outward portion of its respective chamber, the effective cross-sectional area of one of said spool is greater than the effective cross-sectional area of the bore of a primary piston lacking a secondary piston; and pilot ports to communicate the outer portions of each of said chambers with a source of pilot pressure whereby pilot pressure applied through a pilot port acts on at least one of the outward ends of the respective secondary piston and the respective end of said spool so as to urge said spool inwardly away from the pressurized pilot port.

4. A directional control valve comprising:

a valve body having a longitudinally extending bore and a chamber at opposite ends of said bore communicating therewith, each of said chambers having an inward portion and an outward portion;

passage means in said valve body adapted to communicate said bore selectively with a source of fluid under pressure with a reservoir and with pressure-actuated devices;

a valve spool having oppositely disposed ends and being reciprocable within said bore to control communication between said passage means;

a primary piston reciprocable within each of said chambers and having a bore extending longitudinally between an inward end and an outward end to provide communication between the inward and outward portions of its respective chamber;

spring means continuously biasing each of said primary pistons inwardly toward said bore of said valve body to normally engage said spool and center said spool within said bore of said valve body;

a secondary piston reciprocable within said bore of one of said primary pistons and having an outward end exposed to the outer portion of its respective chamber, the effective cross-sectional area of a chamber having a primary piston lacking a secondary piston is greater than the effective cross-sectional are of the end of said valve spool adjacent thereto; and pilot ports to communicate the outer portions of each of said chambers with a source of pilot pressure whereby pilot pressure applied through a pilot port acts on at least one of the outward ends of the respective secondary piston and the respective end of said spool so as to urge said spool inwardly away from the pressurized pilot port.

5. A directional control valve comprising:

a valve body having a longitudinally extending bore and a chamber at opposite ends of said bore communicating therewith, each of said chambers having an inward portion and an outward portion;

passage means in said valve body adapted to communicate said bore selectively with a source of fluid under pressure with a reservoir and with pressure-actuated devices;

a valve spool having oppositely disposed ends and being reciprocable within said bore to control communication between said passage means;

a primary piston reciprocable with each of said chambers and having a bore extending longitudinally between an inward end and an outward end to provide communication between the inward and outward portions of its respective chamber;

spring means continuously biasing each of said primary pistons inwardly toward said bore of said valve body to normally engage said spool and center said spool within said bore of said valve body;

a secondary piston reciprocable within said bore of one of said primary pistons and having an outward end exposed to the outward portion of its respective chamber, the effective cross-sectional area of the bore of a primary piston having a secondary piston is greater than the effective cross-sectional area of a chamber having a primary piston lacking a secondary piston; and pilot ports to communicate the outer portions of each of said chambers with a source of pilot pressure whereby pilot pressure applied through a pilot port acts on at least one of the outward ends of the respective secondary piston and the respective end of said spool so as to urge said spool inwardly away from the pressurized pilot port.

6. The directional control valve of claim 1 wherein the effective cross-sectional area of each of said chambers is greater than the effective cross-sectional area of said bore of said valve body so as to define a shoulder at the inward end of each of said chambers about each of the ends of said bore of said valve body, said spring means urging said primary pistons inwardly toward a centered position until said inward ends of said primary pistons abut their respective shoulders.

7. In a front wheel drive hydraulic control system for a wheeled vehicle having a pump for supplying hydraulic fluid under pressure, a reservoir, and a pair of pressure-actuated motors for driving the front wheels of the vehicle, each motor having an inlet port and an outlet port, a directional control valve selectively operable to control hydraulic fluid flow from said pump to said system comprising:

a valve body having a longitudinally extending bore and a chamber at opposite ends of said bore communicating therewith, each of said chambers having an inward portion and an outward portion;

passage means in said valve body adapted to communicate said bore selectively with a source of fluid under pressure with a reservoir and with pressure-actuated devices;

a valve spool having oppositely disposed ends and being reciprocable within said bore to control communication between said passage means;

a primary piston reciprocable within each of said chambers and having a bore extending longitudinally between an inward end and an outward end to provide communication between the inward and outward portions of its respective chamber;

spring means continuously biasing each of said primary pistons inwardly toward said bore of said valve body to normally engage said spool and center said spool within said bore of said valve body;

a seconary piston reciprocable within said bore of one of said primary pistons and having an outward end exposed to the outward portion of its respective chamber; and pilot ports to communicate the outer portions of each of said chambers with a source of pilot pressure whereby pilot pressure applied through a pilot port acts on at least one of the outward ends of the respective secondary piston and the respective end of said spool so as to urge said spool inwardly away from the pressurized pilot port.

8. The front wheel drive hydraulic control system of claim 7 further including valve means for selectively diverting pilot pressure to said pilot ports of said directional control valve to selectively operate said directional control valve.

9. The front wheel drive hydraulic control system of claim 7 wherein said directional control valve has a passage communicating with said pump, a passage communicating with said reservoir, a passage communicating with said inlet ports of said motors, and a passage communicating with said outlet ports of said motors, said valve spool being centered in said valve body to provide communication between said motor ports and said reservoir in the absence of pilot pressure in both of said chambers, said valve spool being offset on one side of its centered position in said valve body to provide communication between said pump and said inlet ports of said motors to drive the front wheels of the vehicle forwardly when pilot pressure is applied to one chamber, said valve spool being offset on the other side of its centered position in said valve body to provide communication between said pump and said outlet ports of said motors to drive the front wheels of the vehicle rearwardly when pilot pressure is applied to the other chamber.

10. The front wheel drive hydraulic control system of claim 9 wherein said secondary piston is disposed within said primary piston which is reciprocable within said other chamber.

11. A directional control valve comprising:

a valve body having a longitudinally extending bore and a chamber at opposite ends of said bore communicating therewith, each of said chambers having an inward portion and an outward portion;

passage means in said valve body adapted to communicate said bore selectively with a source of fluid under pressure with a reservoir and with pressure-actuated devices;

a valve spool having oppositely disposed ends and being reciprocable within said bore to control communication between said passage means, one end of said valve spool being exposed to one of said chambers;

a primary piston reciprocable within the other of said chambers and having a bore extending longitudinally between an inward end and an outward end to provide communication between the inward and outward portions of said other chamber, a shoulder defined at the inward end of said other chamber to limit inward movement of said primary piston;

a secondary piston reciprocable within said bore of said primary piston and having an outward end exposed to the outward portion of said other chamber, the effective cross-sectional area of said one end of said valve spool being greater than the effective cross-sectional area of said secondary piston, the combined cross-sectional area of said secondary piston and said primary piston being greater than the effective cross-sectional area of said one end of said valve spool; and pilot ports to communicate the outer portions of each of said chambers with a source of pilot pressure, whereby equal pressure applied through each pilot part maintains the valve spool in a centered position within the bore of said valve body, the inward force acting on sai secondary piston being unable to overcome the inward force acting on said one end of said valve spool which, in turn, is unable to overcome the combined inward force acting on said secondary piston and said primary piston, the primary piston being unable to move beyond said shoulder.

12. The directional control valve of claim 11 further incluing a second primary piston in said one chamber, a shoulder defined at the inward end of said one chamber to limit inward movement of said second primary piston, and spring means continuously biasing each of said primary pistons inwardly toward the bore of said valve body until said primary pistons abut their respective shoulders, said spring means moving said valve spool to a centered position within the bore of said valve body when no pilot pressure is applied through either of said pilot ports.

* * * * *